Sept. 15, 1964  J. E. HIERS  3,148,660
MECHANICAL INDICATING DEVICE
Filed May 31, 1963
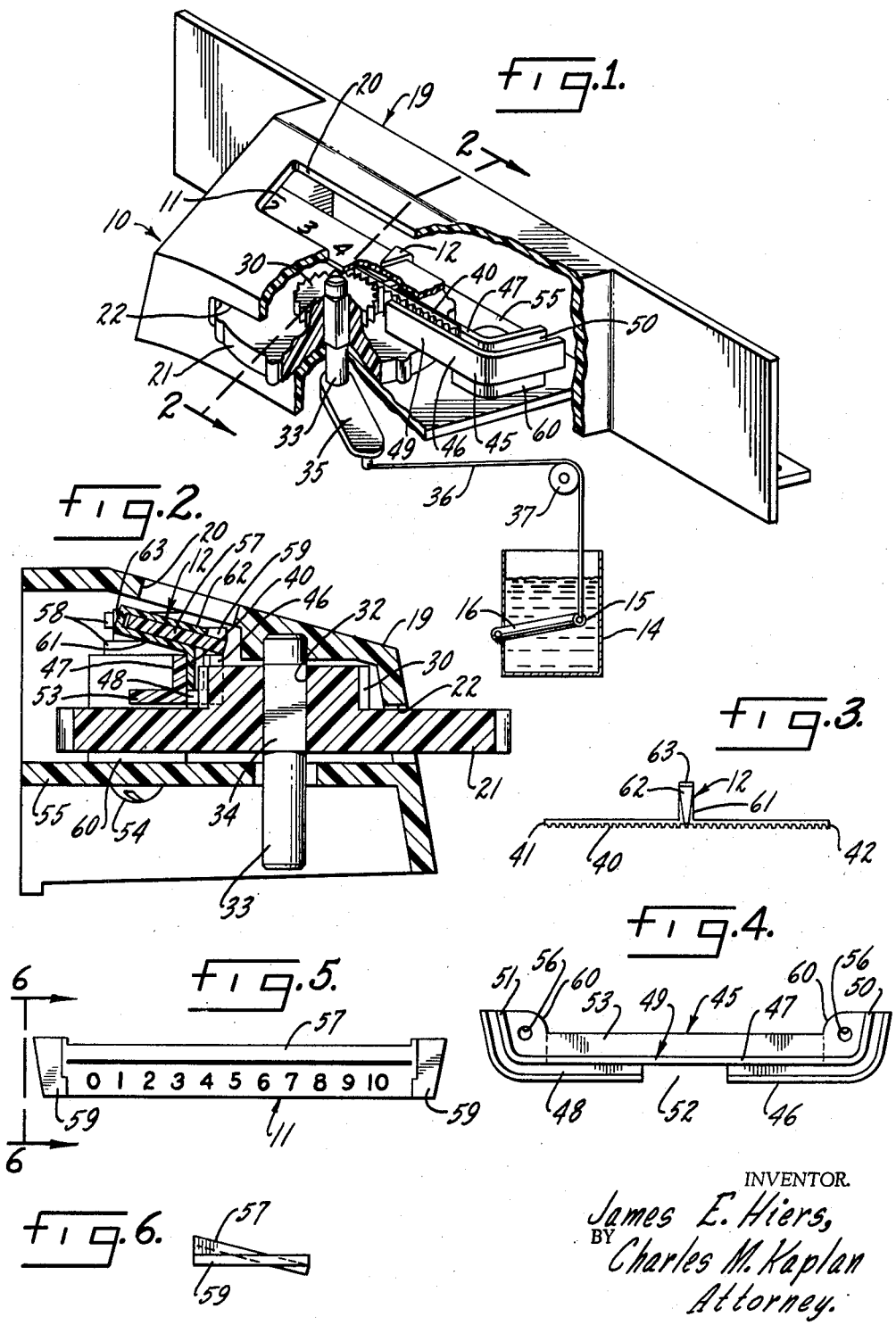
INVENTOR.
James E. Hiers,
BY Charles M. Kaplan
Attorney.

United States Patent Office 3,148,660
Patented Sept. 15, 1964

3,148,660
MECHANICAL INDICATING DEVICE
James E. Hiers, St. Paul, Minn., assignor to Union Tank Car Company, a corporation of New Jersey
Filed May 31, 1963, Ser. No. 284,643
7 Claims. (Cl. 116—133)

This invention relates to indicators, and more in particular to indicator mechanisms having an improved arrangement for causing a pointer to move across a dial.

Indicator mechanisms having a pointer that is caused to move in a straight line by a gear and a rigid rack have long been employed in the prior art. One disadvantage of such mechanisms is that room must be provided for a substantial distance beyond the ends of the indicator scale to accommodate the rigid rack when the pointer is at either end of the scale. When such room is not available, gear and rigid rack mechanisms can be employed by reducing the size of the scale; however, this often causes unacceptable inaccuracies or complicates the mechanism to an extent that makes use of this arrangement impractical.

Other pointer moving arrangements in prior art indicators may employ flexible elements for moving the pointer; such flexible elements can be bent out of the plane of pointer movement and thus do not require clearance room beyond the ends of the scale. Examples of such arrangements are loops or closed strands that travel around pulleys located at either end of the scale; perforated film that is wound around toothed-wheels at opposite ends of the scale; and flexible strands that are coiled around a take-up reel at one end of the scale.

Though such flexible element arrangements are relatively compact when compared with prior art rigid rack arrangements, they are unnecessarily complicated and expensive; for example, numerous moving parts are usually required and this often leads to malfunctioning or to difficulty in calibration of the indicator.

Accordingly, it is an object of this invention to provide an improved indicator mechanism that does not suffer from prior art deficiencies described above because a flexible rack is employed to move the pointer.

Another object is to provide a relatively inexpensive, sturdy, easily maintained indicator mechanism.

Another object is to provide a compact indicator mechanism whose pointer moves in a straight line wherein the means for causing movement of a pointer need not extend a significant distance beyond the range of travel of the pointer.

Another object is to provide an indicator mechanism having few moving parts.

A further object is to provide indicator mechanism usable in environments corrosive to metals.

Another object is to provide an easily calibrated or adjusted indicator mechanism.

Other objects and advantages of the invention will be apparent from the drawing, specification, and claims, and the scope of the invention will be pointed out in the claims.

Briefly stated, according to one aspect of the invention, an indicator mechanism having a pointer movable relative to a scale employs improved means for moving the pointer which includes a slidingly supported flexible rack. Gear means mates with the rack so as to cause movement thereof, and the pointer is connected to the rack so that movement of the rack causes the pointer to move across the scale.

In the drawing:

FIG. 1 is a schematic, perspective, partially broken away view of a preferred embodiment of the invention.

FIG. 2 is an enlarged cross sectional view taken along the line 2—2 in FIG. 1.

FIG. 3 is a top plan view of rack 40.

FIG. 4 is a top plan view of channel means 45.

FIG. 5 is a top plan view of bar 57.

FIG. 6 is an end view of bar 57 taken along line 6—6 in FIG. 5.

As shown in the drawing, indicator unit 10 includes a scale 11 across which a pointer 12 is movable in a straight line. Pointer 12 and scale 11 are calibrated to indicate a condition, such as the volume of liquid to be discharged from a vessel 14. This could be accomplished by having the position of the pointer 12 on the scale 11 calibrated to correspond to the vertical position of the end 15 of a flexible hollow tube 16. The vertical position of the tube end 15 would determine the volume of liquid flowing from the vessel 14 because after the liquid level reaches end 15, liquid ceases to pass through the tube 16. This type of volume controlling arrangement finds utility in brine systems for regenerating home water softeners; it is advantageous to make such systems adjustable and to have a visible indication of the condition of such systems. The preferred embodiment of the indicator mechanism herein described can be used in such a system. However, it is to be understood that this invention has general utility, and it is not intended to limit the use of the indicator described herein to any specific system.

Turning now to the details of the improved indicator, a housing 19 is employed to support and protect the mechanism. Scale 11 is visible through a window 20 in housing 19. A rotatable hand knob 21 for changing a condition protrudes through a generally horizontal slot 22 in housing 19. A toothed gear 30 may be made as an integral part of the knob 21. Gear 30 and knob 21 have a rectangular opening 32 through their center. A rotatable shaft 33 has a rectangular portion 34 which is received in frictional engagement with the hole 32. One end of the shaft 33 has means, such as a lever 35, connected thereto for changing a condition. It is to be understood, however, that other condition changing means, such as gears, wheels, screw threads, etc., may be employed in place of the lever 35 without departing from the invention. Thus rotation of the knob 21 changes a condition by causing simultaneous rotation of the shaft 33, gear 30, and condition changing means 35, which in turn moves strand 36 over pulley 37 to raise or lower tube end 15.

The teeth of gear 30 mate with the teeth of a flexible rack 40 in a generally vertical plane of gear coaction. Rack 40 has discrete ends 41 and 42 and is formed from synthetic plastic material of sufficient flexibility and resiliency to permit bending of the rack out of the plane of gear coaction and recovery to such plane. In a preferred embodiment of the invention, the rack is made from commercially available polypropylene plastic sold by the Enjay Chemical Co. under the designation Escon General Purpose polypropylene. Rack 40 could also be made from polyethylene, vinyl, and similar commercially available resilient plastic materials.

Rack 40 is received in and slidingly supported by the upwardly facing open side of channel means 45, which has a generally U-shaped cross section defined by front leg 46, back leg 47, and bottom 48. Channel means 45 has a straight portion 49 lying in the plane of gear coaction, and portions 50 and 51 at a relatively sharp angle to the plane of gear coaction (e.g., 80°). A gap 52 is provided in leg 46 and bottom 48 in straight portion 49 to permit the teeth on gear 30 to mate with those on rack 40. Leg 47 supports the back of rack 40 as gear 30 presses rack 40 rearwardly; flange 53 is provided to strengthen leg 47 against rearward deflection. Channel means 45 is held in place by screws 54 passing through shelf 55 into holes 56 in support lugs 60. Lugs 60 raise straight portion 49 so as to permit knob 21 to pass therebeneath.

Scale 11 may be imprinted on or supported by the upper surface of a bar 57. Slots defined by projections 58 on the side portions of housing 19 receive the straight ends 59 of bar 57 so as to support same. Rack 40 passes under bar 57 closely adjacent thereto; this enables the bottom of bar 57 to act as a retainer means preventing rack 40 from popping out of channel means 45.

Pointer 12 is attached to a central portion of rack 40 so as to be movable therewith. As shown in FIG. 2, pointer 12 has a generally U-shaped cross section defined by a leg 61 hidden beneath bar 57, a visible leg 62 that travels along scale 11, and a portion 63 connecting legs 61 and 62 in close proximity to the surfaces of bar 57.

Rotation of knob 21 causes rotation of gear 30, which in turn causes movement of rack 40 in a path guided by channel means 45 and bar 57; this causes pointer 12 to move through portion 49 in a straight line across scale 11. Calibration of the position of pointer 12 on scale 11 with the conditions to be indicated, such as the vertical height of the tube 16, can be readily accomplished by those skilled in the art without detailed explanation.

Portions 50 and 51 of channel means 45 do not extend significantly beyond the scale 11 in the plane of gear coaction. This is brought about by the flexibility of rack 40, which permits rack 40 to be bent at a relatively sharp angle. This means that the indicator unit can be relatively narrow in its lateral dimension because it need not provide room for lateral travel of a rigid rack when pointer 12 is at opposite ends of scale 11. Channel means 45 supports rack 40 without the need for moving parts, such as take-up reels or spools, or pulleys at the ends of the scale, and thus eliminates a source of malfunctioning of indicator mechanisms.

The elements of the indicator mechanism 10 described herein, excepting rack 40, may be fabricated from plastic materials such as phenolic, styrene, vinyl, etc. This permits the indicator to be employed in highly corrosive environments, such as those associated with brine tanks of home water softener regeneration systems, without the danger of corrosion of the parts. The use of synthetic plastic materials also contributes to the economy of the indicator because the parts can be molded by inexpensive techniques.

Adjustment or calibration of pointer 12 with respect to scale 11 may be accomplished by slightly flexing the rack 40 and channel means 45, and then sliding rack 40 with respect to gear 30. This is readily accomplished because of the flexible nature of the plastic materials from which rack 40 and channel means 45 are made.

It will be understood that while the form of the invention herein shown and described constitutes a preferred embodiment, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit of the invention.

What is claimed is:

1. In an indicator mechanism having a pointer movable relative to a scale, the improvement in means for moving said pointer comprising:
  (A) a flexible rack,
  (B) said pointer being connected to said rack so that movement of said rack causes said pointer to move across said scale,
  (C) channel means having a generally U-shaped cross section oriented with its open side facing upwardly so as to receive said rack and thereby slidingly support said rack, opposite end portions of said channel being at a relatively sharp angle to the plane of movement of said pointer for bending a portion of said rack away from said scale as said pointer approaches either end of said scale to thereby eliminate the need for clearance for said rack beyond the ends of said scale, and there being a gap in one wall of said channel for exposing a portion of said rack, and
  (D) gear means mating with said exposed portion of said rack for causing movement thereof.

2. An indicator mechanism for signifying a condition comprising:
  (A) a rotatable substantially vertical shaft having means for changing said conditions connected thereto,
  (B) a hand rotatable substantially horizontal knob having a hole through its center receiving said shaft for causing rotation of said shaft,
  (C) a substantially horizontal gear having a hole through its center receiving said shaft so that rotation of said shaft causes rotation of said gear,
  (D) a flexible rack for mating with said gear in a plane of gear-coaction,
  (E) channel means oriented with its open side facing upwardly so as to receive and slidingly support said rack with its teeth in a substantially vertical plane, there being a gap in one side of said channel means for exposing said rack in said plane of gear coaction to permit mating with said gear, and a portion of said knob passing beneath said channel means,
  (F) bar means having thereon a scale for signifying said condition, said bar means being located above said rack,
  (G) pointer means secured to a central portion of said rack so that said pointer is movable therewith, and
  (H) opposite end portions of said channel means closely adjacent the ends of said scale being at a relatively sharp angle to said plane of gear coaction, whereby end portions of said rack are bent away from said plane of gear coaction as said pointer approaches the ends of said scale to thus eliminate the need for clearance for said rack beyond the ends of said scale.

3. An indicator unit for signifying a condition comprising:
  (A) a housing, there being a generally vertical slot in a side portion of said housing and a window in a top portion of said housing,
  (B) a rotatable substantially vertical shaft having condition changing means connected thereto,
  (C) a substantially horizontal knob having a hole through its center receiving said shaft for causing rotation of said shaft, a portion of said knob extending through said slot so as to be accessible for hand rotation,
  (D) a substantially horizontal gear having a hole through its center receiving said shaft so that rotation of said shaft causes rotation of said gear,
  (E) a flexible rack for mating with said gear in a plane of gear-coaction,
  (F) channel means having a generally U-shaped cross section oriented with its open side facing upwardly so as to receive and slidingly support said rack with its teeth in a substantially vertical plane, there being a gap in one side of a straight portion of said channel means for exposing said rack in said plane of gear-coaction to permit mating with said gear, and said knob passing beneath said channel means,
  (G) bar means having thereon a scale for signifying said condition, said bar means being visible through said window,
  (H) a pointer secured to a central portion of said rack so that said pointer is movable therewith in a straight line across said scale, and
  (I) opposite end portions of said channel means closely adjacent the ends of said scale being at an angle to said plane of gear-coaction, whereby end portions of said rack are bent away from said plane of gear-coaction as said pointer approaches the ends of said scale to thus eliminate the need for clearance for said rack beyond the ends of said scale.

4. An indicator unit for signifying a condition comprising:
(A) a housing, there being a generally vertical slot in a side portion of said housing and a window in a top portion of said housing,
(B) a rotatable, substantially vertical shaft having condition changing means connected thereto,
(C) a substantially horizontal knob having a hole through its center receiving said shaft for causing rotation of said shaft, a portion of said knob extending through said slot so as to be accessible for hand rotation,
(D) a substantially horizontal gear having a hole through its center receiving said shaft so that rotation of said shaft causes rotation of said gear,
(E) a rack having discrete ends and having teeth projecting from a surface thereof for mating with said gear in a generally vertical plane of gear-coaction, said rack being formed from synthetic plastic material of sufficient flexibility and resiliency to permit bending out of said plane and recovery to said plane,
(F) channel means having a generally U-shaped cross section oriented with its open side facing upwardly so as to receive and slidingly support said rack with said teeth in a substantially vertical plane, there being a gap in one side of said channel means for exposing said rack in said plane of gear-coaction to permit mating with said gear, said gear pressing said rack against the side of said channel means opposite said gap so that said side supports said rack in contact with said gear, and said knob passing beneath said channel means,
(G) bar means having thereon a scale for signifying said condition, said bar means being located above said rack and closely adjacent thereto for preventing accidental displacement of said rack from said channel means, said scale being visible through said window,
(H) a generally U-shaped pointer secured to a central portion of said rack so that said pointer is movable therewith, said pointer having a leg passing beneath said bar means, a visible leg above said bar means for traveling across said scale, and a portion connecting said legs, and
(I) opposite end portions of said channel means closely adjacent the ends of said scale being at an angle to said plane of gear-coaction, whereby end portions of said rack are bent away from said plane of gear-coaction as said pointer approaches the ends of said scale to thus eliminate the need for clearance for said rack beyond the ends of said scale.

5. In an indicator mechanism having a pointer movable relative to a scale, the improvement in means for moving said pointer comprising:
(A) a flexible rack,
(B) said pointer being connected to said rack so that movement of said rack causes said pointer to move across said scale,
(C) channel means having a generally U-shaped cross section oriented with its open side facing upwardly so as to receive said rack and thereby slidingly support said rack, opposite end portions of said channel being at a relatively sharp angle to the plane of movement of said pointer for bending a portion of said rack away from said scale as said pointer approaches either end of said scale to thereby eliminate the need for clearance for said rack beyond the ends of said scale, and there being a gap in said channel for exposing a portion of said rack,
(D) gear means mating with said exposed portion of said rack for causing movement thereof, and
(E) bar means having said scale thereon, said bar means being supported above said open side of said channel means, closely adjacent said rack for preventing accidental displacement of said rack from said channel means.

6. The invention defined in claim 5 wherein said bar means is supported by means defining a pair of slots slidably receiving end portions of said bar means.

7. An indicator mechanism for signifying a condition comprising:
(A) a rotatable shaft having means for changing said condition connected thereto,
(B) a rotatable knob attached to said shaft for causing rotation of said shaft,
(C) a gear attached at its center to said shaft so that rotation of said shaft causes rotation of said gear,
(D) a flexible rack for mating with said gear in a plane of gear-coaction,
(E) channel means receiving and slidingly supporting said rack, there being a gap in said channel means for exposing said rack in said plane of gear-coaction to permit mating with said gear, and a portion of said knob being below said channel means,
(F) bar means having thereon a scale for signifying said condition, said bar means being located above said rack,
(G) pointer means secured to a central portion of said rack so that said pointer is movable therewith, and
(H) opposite end portions of said channel means closely adjacent the ends of said scale being at a relatively sharp angle to said plane of gear-coaction, whereby end portions of said rack are bent away from said plane of gear-coaction as said pointer approaches the ends of said scale to thus eliminate the need for clearance for said rack beyond the ends of said scale.

References Cited in the file of this patent
UNITED STATES PATENTS

| | | |
|---|---|---|
| 2,434,470 | Rhodes | Jan. 13, 1948 |
| 2,538,188 | Brietzke | Jan. 16, 1951 |
| 2,905,017 | Randolph | Sept. 22, 1959 |
| 2,931,333 | Whittier | Apr. 5, 1960 |
| 2,932,274 | Wennerstron | Apr. 12, 1960 |
| 3,059,489 | Gourley | Oct. 23, 1962 |
| 3,084,014 | Molloy | Apr. 2, 1963 |

FOREIGN PATENTS

| | | |
|---|---|---|
| 451,146 | Great Britain | July 30, 1936 |